US010157632B1

(12) United States Patent
Song et al.

(10) Patent No.: US 10,157,632 B1
(45) Date of Patent: Dec. 18, 2018

(54) AREAL DENSITY CAPABILITY IMPROVEMENT WITH SPIN-ORBIT TORQUE BASED STRUCTURES SURROUNDING MAIN POLE TIP

(71) Applicant: Western Digital Technologies, Inc., San Jose, CA (US)

(72) Inventors: Suping Song, Fremont, CA (US); Zhanjie Li, Pleasanton, CA (US); Michael Kuok San Ho, Redwood City, CA (US); Quang Le, San Jose, CA (US); Alexander M. Zeltser, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/631,932

(22) Filed: Jun. 23, 2017

(51) Int. Cl.
*G11B 5/147* (2006.01)
*G11B 5/31* (2006.01)
*G11B 5/012* (2006.01)
*G11B 5/127* (2006.01)

(52) U.S. Cl.
CPC ............ *G11B 5/3113* (2013.01); *G11B 5/012* (2013.01); *G11B 5/1278* (2013.01); *G11B 5/147* (2013.01); *G11B 5/315* (2013.01); *G11B 5/3133* (2013.01)

(58) Field of Classification Search
CPC ..... G11B 5/1278; G11B 5/147; G11B 5/3133; G11B 5/315
USPC ............................ 360/125.03, 125.12, 125.3
See application file for complete search history.

(56) References Cited

U.S. PATENT DOCUMENTS

| 8,238,059 B1 | 8/2012 | Tang et al. |
| 8,295,006 B2 | 10/2012 | Sugano et al. |
| 8,611,046 B2 | 12/2013 | Wu et al. |
| 8,724,262 B1 * | 5/2014 | Koui ........................ G11B 5/23 360/125.3 |
| 9,196,271 B1 | 11/2015 | Shirotori et al. |

(Continued)

OTHER PUBLICATIONS

Song, et al.; Micromagnetic Analysis of Adjacent Track Erasure of Wrapped-Around Shielded PMR Writers; IEEE Transactions on Magnetics; vol. 45, No. 10; dated Nov. 10, 2009; 10 total pages.

(Continued)

*Primary Examiner* — Jefferson Evans
(74) *Attorney, Agent, or Firm* — Patterson & Sheridan, LLP; Steven Versteeg

(57) ABSTRACT

The present disclosure generally relates to data storage devices, and more specifically, to a magnetic media drive employing a magnetic recording head. The head includes a main pole, a heavy metal structure surrounding at least a portion of the main pole at a media facing surface (MFS), and two magnetic structures sandwiching the heavy metal structure. Spin-orbit torque (SOT) is generated from the heavy metal structure, inducing magnetization switching (or precession) in the magnetic structures. The SOT reduces the magnetic flux shunting from the main pole to the trailing shield, and the magnetization switching sharpens the write field profile in the cross-track direction. The SOT based head with the magnetic structures sandwiching the heavy metal structure increases both track density (tracks per inch) and linear density (bit per inch), which in turn increases the areal density capability (ADC), which is the product of tracks per inch and bit per inch.

30 Claims, 13 Drawing Sheets

(56) References Cited

U.S. PATENT DOCUMENTS

| | | | |
|---|---|---|---|
| 9,218,828 B1 * | 12/2015 | Koui | G11B 5/314 |
| 9,230,571 B1 | 1/2016 | Chen et al. | |
| 9,305,583 B1 | 4/2016 | Zhang et al. | |
| 9,311,934 B1 | 4/2016 | Shiimoto et al. | |
| 9,355,654 B1 | 5/2016 | Mallary | |
| 9,361,912 B1 | 6/2016 | Liu et al. | |
| 9,466,319 B1 | 10/2016 | Tang et al. | |
| 9,626,990 B2 * | 4/2017 | Tang | G11B 5/112 |
| 2007/0211379 A1 * | 9/2007 | Kato | G11B 5/1278 360/125.03 |
| 2008/0232001 A1 | 9/2008 | Bonhote et al. | |
| 2008/0278861 A1 | 11/2008 | Jiang et al. | |
| 2011/0038081 A1 * | 2/2011 | Contreras | B82Y 25/00 360/125.03 |
| 2013/0063840 A1 * | 3/2013 | Koui | G11B 5/1278 360/110 |
| 2014/0177101 A1 * | 6/2014 | Koui | G11B 5/235 360/125.06 |
| 2015/0287426 A1 | 10/2015 | Mihajlovic et al. | |
| 2015/0310881 A1 * | 10/2015 | Koui | G11B 5/314 360/235.4 |
| 2016/0064015 A1 * | 3/2016 | Rivkin | G11B 5/23 360/46 |
| 2016/0148627 A1 * | 5/2016 | Nagasaka | G11B 5/35 360/123.05 |
| 2016/0180868 A1 * | 6/2016 | Gubbins | G11B 5/3116 360/125.12 |
| 2017/0309299 A1 * | 10/2017 | Tang | G11B 5/314 |

OTHER PUBLICATIONS

Mihajlovic, et al.; Spin Orbit Torque Switching of CoFeB Magnetic Free Layers With Pt and Ta Heavy Metals for SOT MRAM Development; IEEE Magnetics; TMRC 2016; Aug. 17-19, 2016; pp. 53 and 54.

* cited by examiner

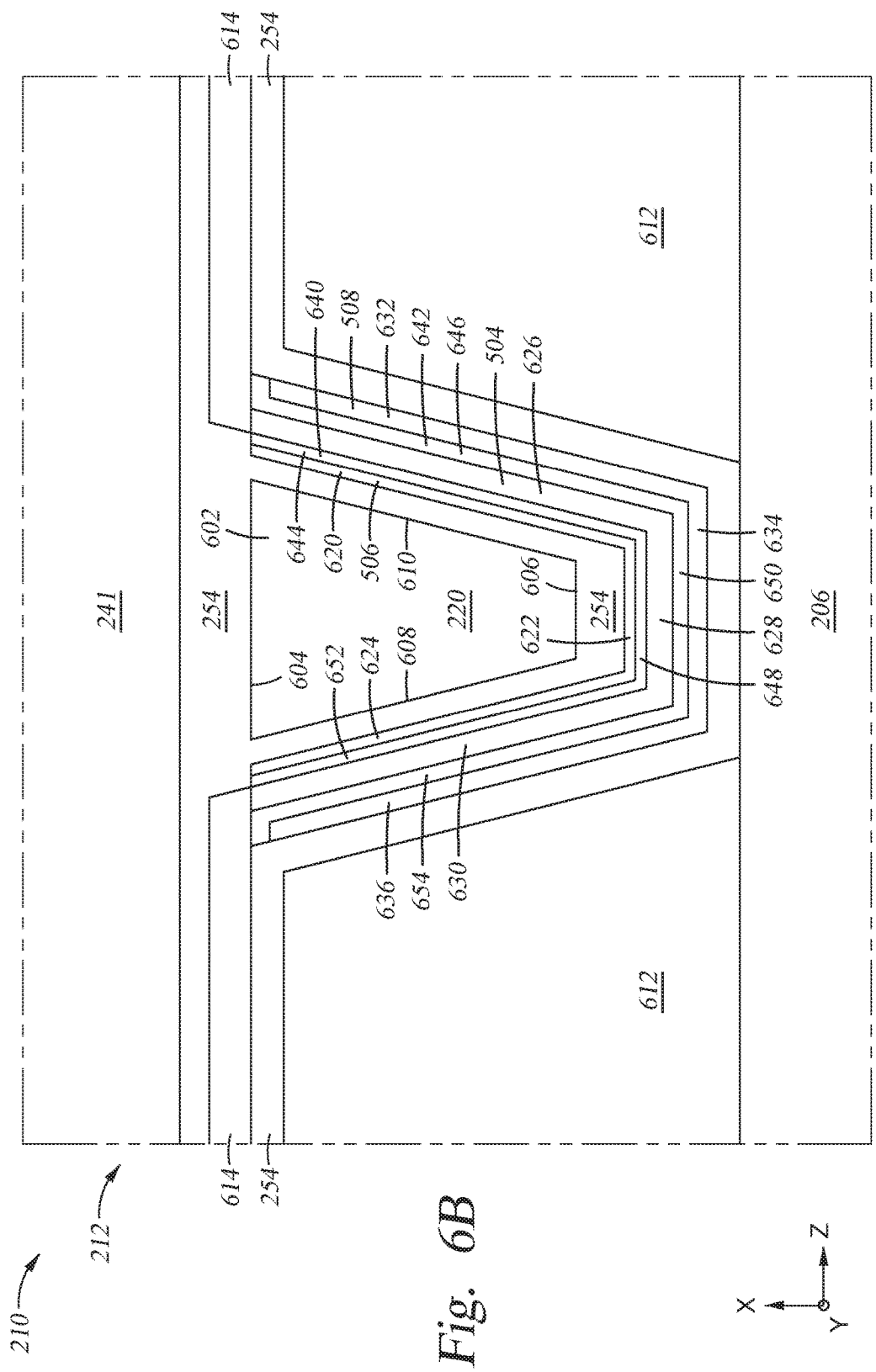

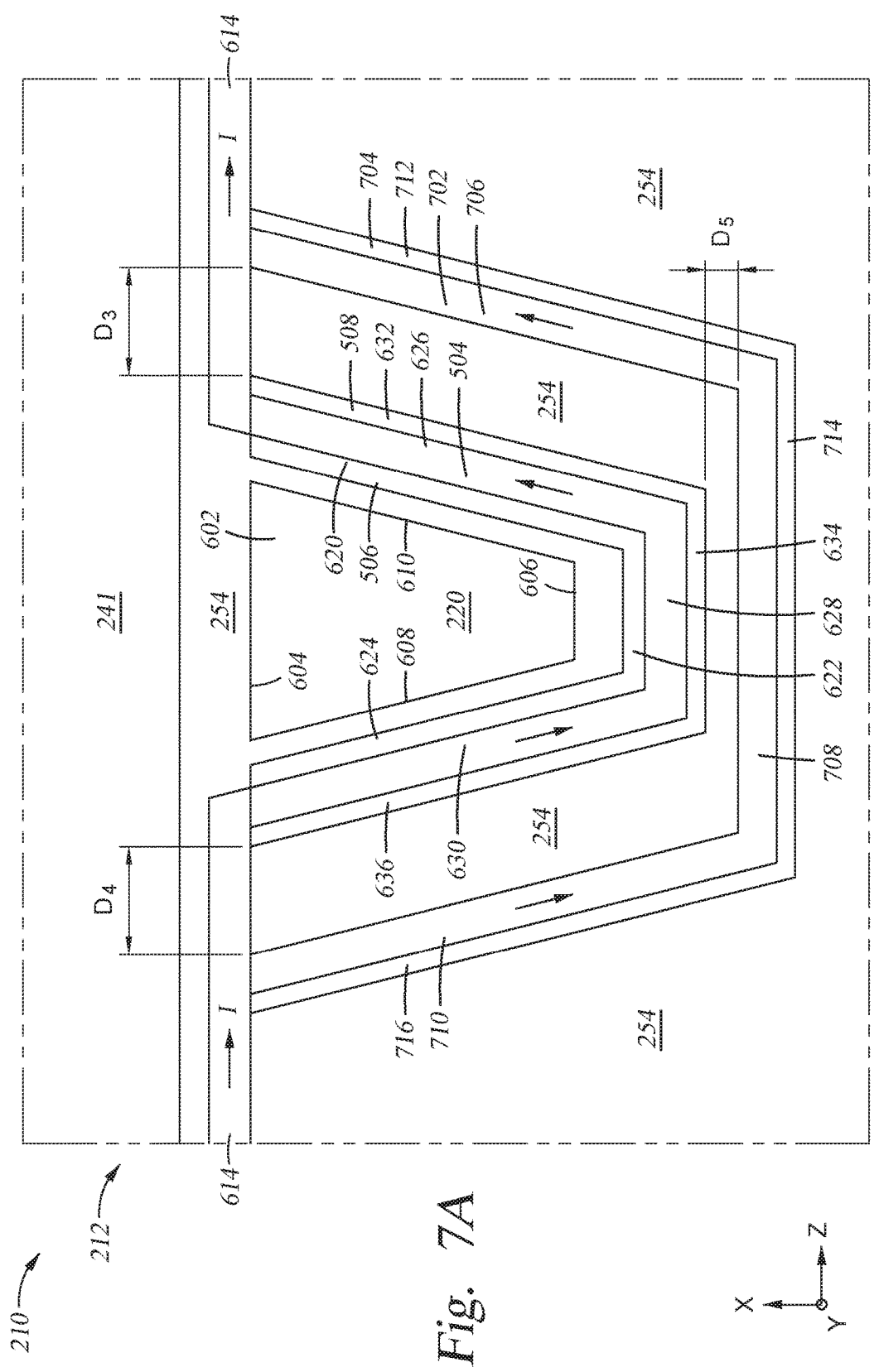

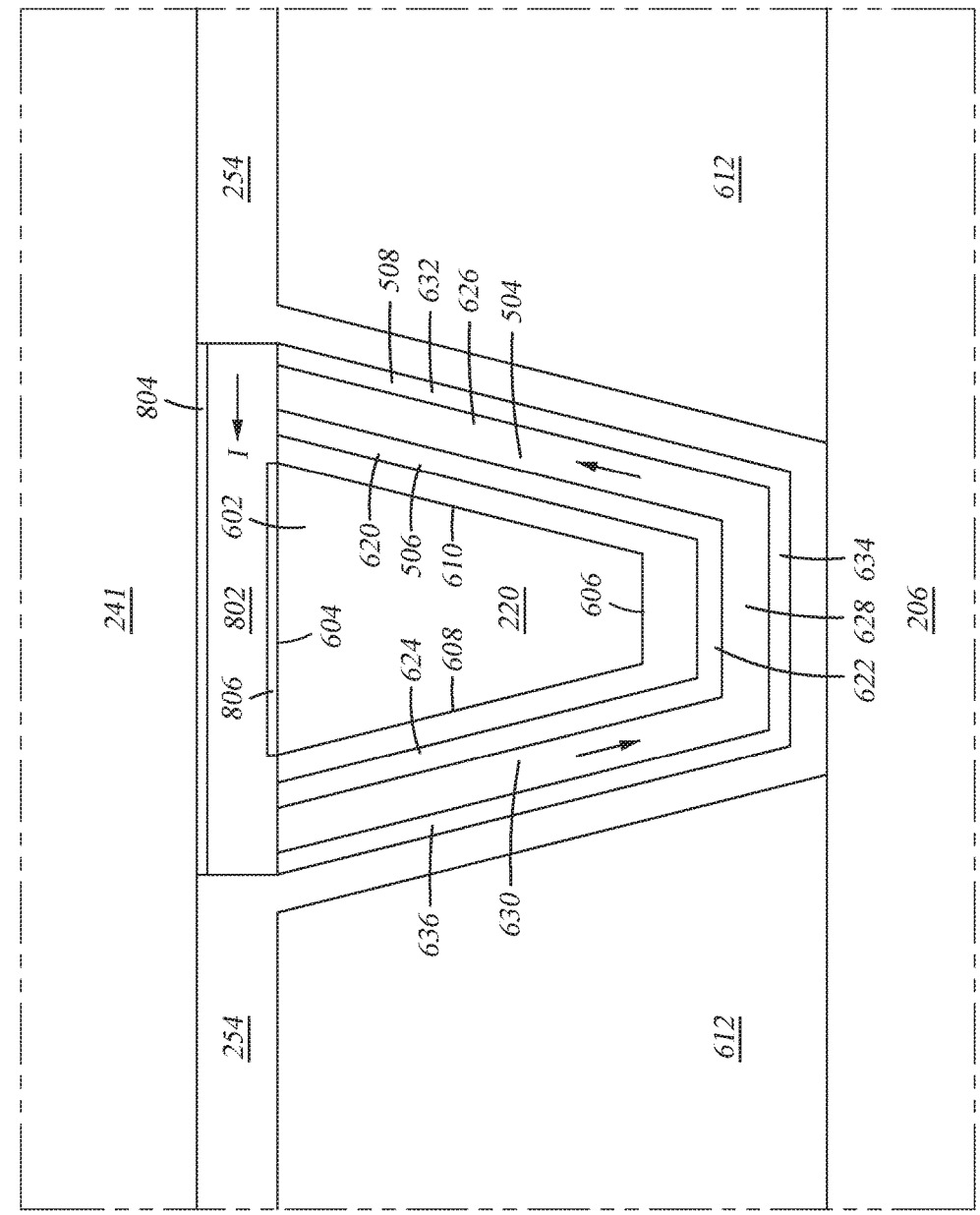

AREAL DENSITY CAPABILITY IMPROVEMENT WITH SPIN-ORBIT TORQUE BASED STRUCTURES SURROUNDING MAIN POLE TIP

BACKGROUND

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). For example, microwave assisted magnetic recording (MAMR) utilizes spin-transfer torque (STT), which is generated from a pseudo spin-valve structure. During operation, electrical current flows from the main pole to the trailing shield hot seed layer, and the spin-torque layer magnetization switching (or precession) is induced by the STT.

The pseudo spin-valve structure is difficult to make, and high switching current and voltage ($V_{jump}$) are utilized during its operation, leading to a lower level of energy efficiency.

Therefore, there is a need in the art for an improved data storage device.

SUMMARY OF THE DISCLOSURE

The present disclosure generally relates to data storage devices, and more specifically, to a magnetic media drive employing a magnetic recording head. The head includes a main pole, a heavy metal structure surrounding at least a portion of the main pole at a media facing surface (MFS), and two magnetic structures sandwiching the heavy metal structure. Spin-orbit torque (SOT) is generated from the heavy metal structure, inducing magnetization switching (or precession) in the magnetic structures. The magnetization switching (or precession) in the magnetic structures sharpens the write field profile in the cross-track direction, which improves track density and write-ability. The SOT based head with the magnetic structures sandwiching the heavy metal structure increases both track density (tracks per inch) and linear density (bit per inch), which in turn increases the areal density capability (ADC), which is the product of tracks per inch and bit per inch.

In one embodiment, a magnetic recording head includes a trailing shield, a main pole, a heavy metal layer disposed between the trailing shield and the main pole, and a magnetic shunt blocking layer coupled to the heavy metal layer.

In another embodiment, a magnetic recording head includes a trailing shield hot seed layer, a main pole, a dielectric material disposed between the main pole and the trailing shield hot seed layer, a first magnetic structure surrounding a portion of the main pole at a media facing surface, a heavy metal structure surrounding the first magnetic structure, and a second magnetic structure surrounding the heavy metal structure, wherein the heavy metal structure is sandwiched between the first magnetic structure and the second magnetic structure.

In another embodiment, a magnetic recording head includes a trailing shield hot seed layer, a main pole, a heavy metal layer disposed between the trailing shield hot seed layer and the main pole, a first magnetic structure surrounding a portion of the main pole at a media facing surface, a heavy metal structure surrounding the first magnetic structure, and a second magnetic structure surrounding the heavy metal structure, wherein the heavy metal structure is sandwiched between the first magnetic structure and the second magnetic structure.

In another embodiment, a magnetic recording head includes a main pole, means for generating spin-orbit torque, and means for magnetization switching that is induced by the spin-orbit torque, wherein the means for generating spin-orbit torque is sandwiched between the means for magnetization switching.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6B are MFS views of a portion of a write head of FIG. 5 according to embodiments.

FIGS. 7A-7B are MFS views of a portion of the write head of FIG. 5 according to embodiments.

FIGS. 8A-8B are MFS views of a portion of the write head of FIG. 5 according to embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a main pole, a heavy metal structure surrounding at least a portion of the main pole at a media facing surface (MFS), and two magnetic structures sandwiching the heavy metal structure. Spin-orbit torque (SOT) is generated from the heavy metal structure, inducing magnetization switching (or precession) in the magnetic structures. On one hand, the SOT generated between the main pole and a trailing shield executes a torque on the surface magnetization of the main pole, which reduces the magnetic flux shunting from the main pole to the trailing shield, leading to improved write-ability and linear density (bit per inch). On the other hand, the magnetization switching in the magnetic structures sharpens the write field profile in the cross-track direction, which improves track density (tracks per inch). The magnetization switching in the magnetic structures also improves write-ability, leading to improved linear density. In summary, the SOT based head with the magnetic structures sandwiching the heavy metal structure increases both track density and linear density, which in turn increases the areal density capability (ADC), which is the product of tracks per inch and bit per inch.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
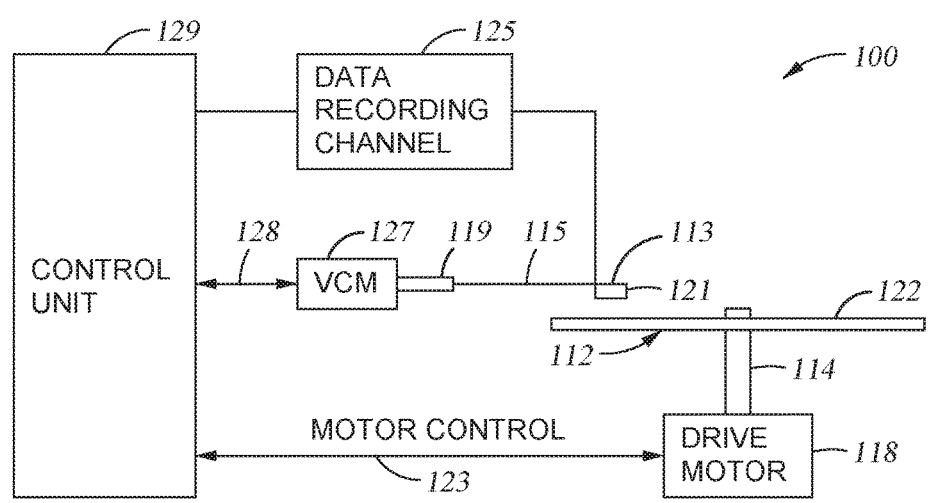
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a heavy metal structure sandwiched between two magnetic structures. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2A:
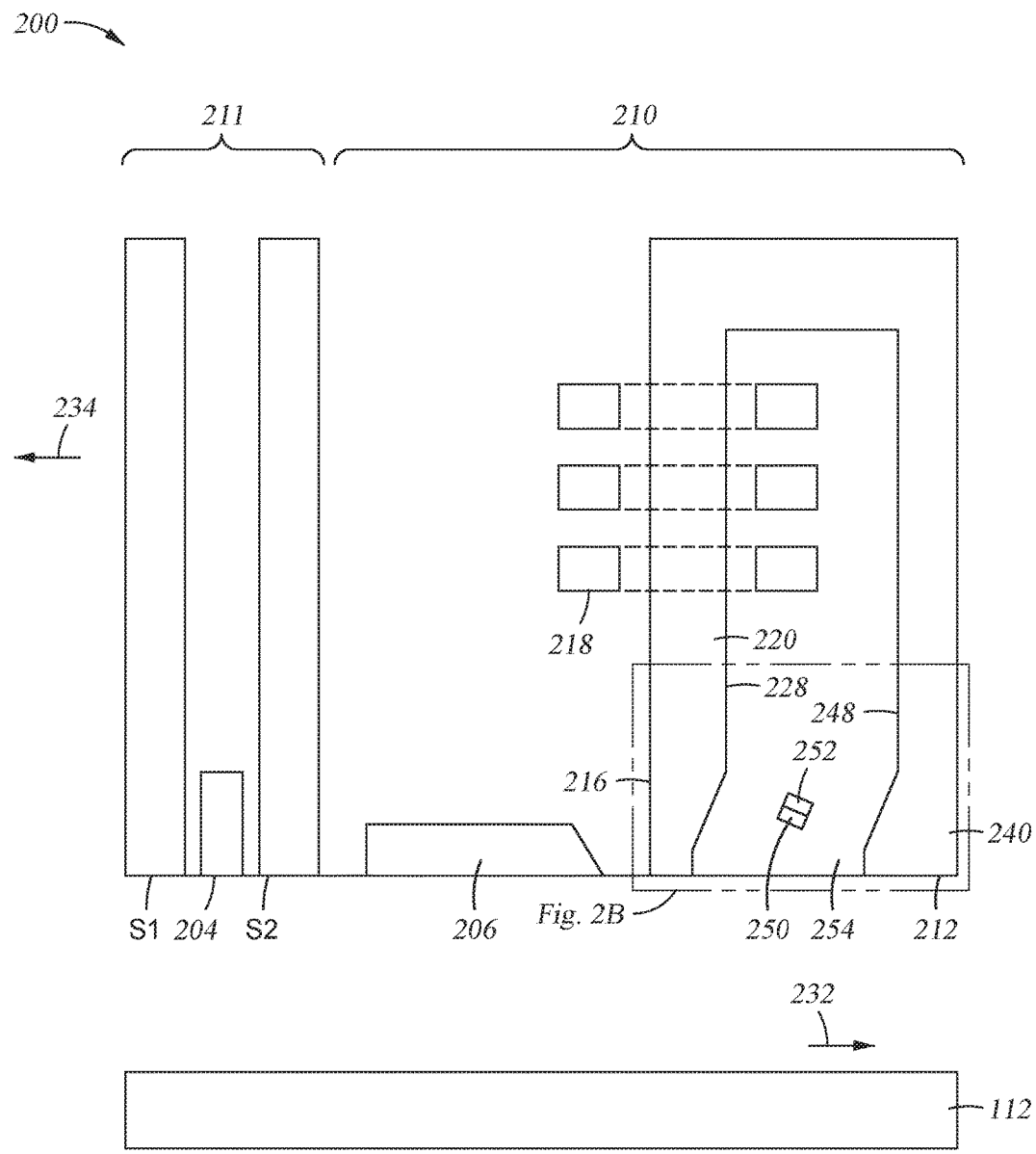
FIGS. 2A-2B are fragmented, cross sectional side views of a read/write head facing a magnetic disk according to one embodiment.
Figure 2B:
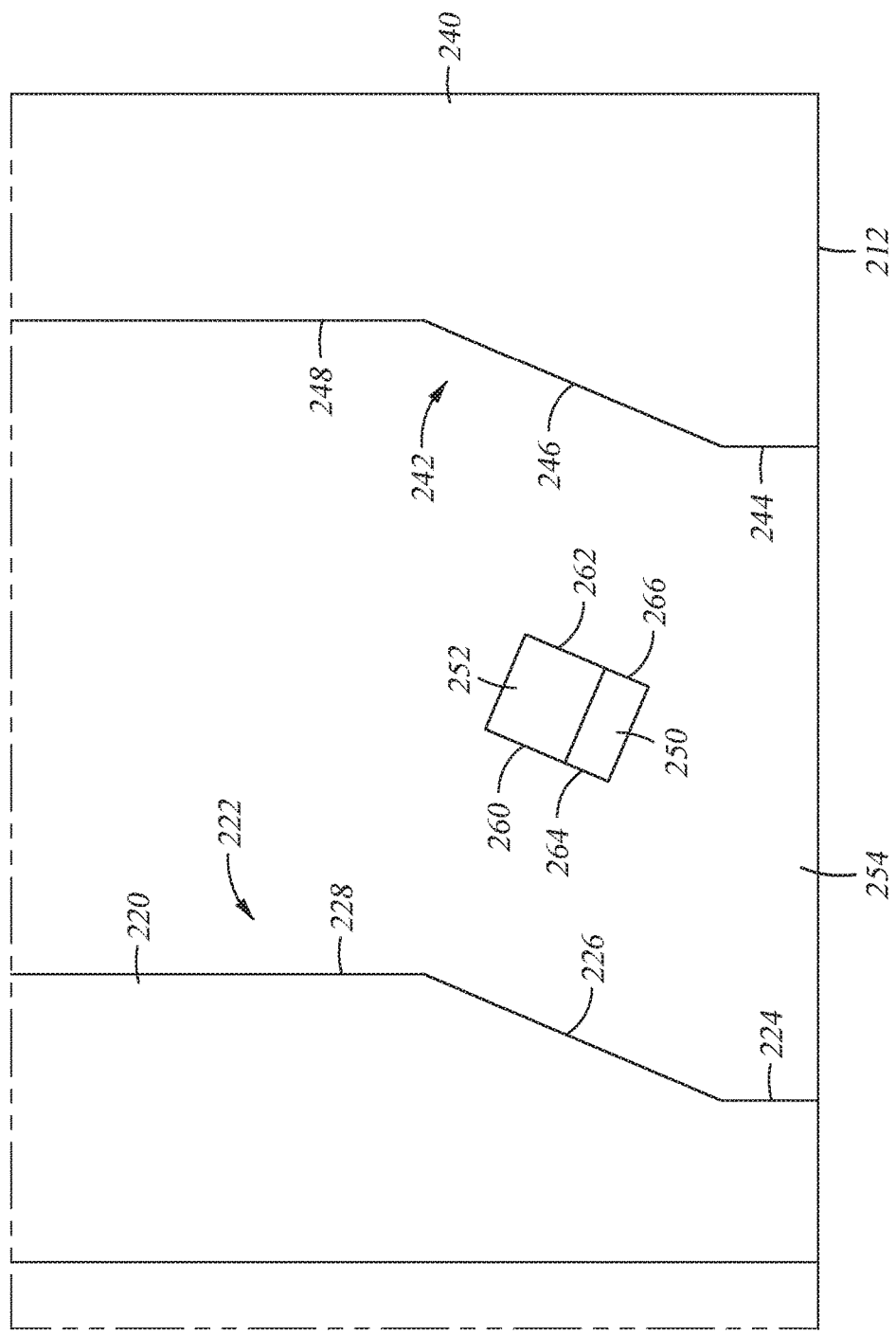

FIGS. 2A-2B are a fragmented, cross sectional side views of a read/write head 200 facing the magnetic disk 112 according to one embodiment. The read/write head 200 may correspond to the magnetic head assembly 121 described in FIG. 1. The read/write head 200 includes a MFS 212, such as an air bearing surface (ABS), facing the disk 112, a magnetic write head 210, and a magnetic read head 211. As shown in FIG. 2A, the magnetic disk 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

As shown in FIGS. 2A and 2B, the write head 210 includes a main pole 220, a leading shield 206, a trailing shield 240, and a coil 218 that excites the main pole 220. The coil 218 may have a "pancake" structure which winds around a back-contact between the main pole 220 and the trailing shield 240, instead of a "helical" structure shown in FIG. 2A. The write head 210 further includes a heavy metal layer 252 and a magnetic shunt blocking layer 250 coupled to the heavy metal layer 252. The heavy metal layer 252 and the magnetic shunt blocking layer 250 are disposed between the main pole 220 and the trailing shield 240. The heavy metal layer 252 and the magnetic shunt blocking layer 250 are recessed from the MFS 212, as shown in FIGS. 2A and 2B. In some embodiments, the heavy metal layer 252 and the magnetic shunt blocking layer 250 are disposed at the MFS 212. A dielectric material 254, such as alumina, is located between the trailing shield 240 and the main pole 220, and the dielectric material 254 surrounds the heavy metal layer 252 and the magnetic shunt blocking layer 250. The dielectric material 254 is also disposed between the leading shield 206 and the main pole 220. The main pole 220 may be a magnetic material such as a FeCo alloy. The leading shield 206 and the trailing shield 240 may be a magnetic material, such as NiFe alloy.

The main pole 220 includes a leading side 216 and a trailing side 222. The trailing side 222 includes a first portion 224 extending from the MFS 212, a second portion 226 connected to the first portion 224, and a third portion 228 connected to the second portion 226. The first portion 224 and the third portion 228 are substantially perpendicular to the MFS 212. The second portion 226 extends obliquely between the first portion 224 and the third portion 228. In some embodiments, the trailing side 222 may be substantially perpendicular to the MFS 212. The trailing shield 240 includes a leading side 242. The leading side 242 includes a first portion 244 extending from the MFS 212, a second portion 246 connected to the first portion 244, and a third portion 248 connected to the second portion 246. The first portion 244 and the third portion 248 are substantially perpendicular to the MFS 212. The second portion 246 extends obliquely between the first portion 244 and the third portion 248. The second portion 226 of the trailing side 222 of the main pole 220 is substantially parallel to the second portion 246 of the leading side 242 of the trailing shield 240. The heavy metal layer 252 includes a first side 260 and a second side 262 opposite the first side 260. The first side 260 faces the second portion 226 of the trailing side 222 of the main pole 220, and the second side 262 faces the second portion 246 of the leading side 242 of the trailing shield 240. The definition of the term "face" is extended to include a material located between a first element that is facing a second element and the second element. For example, the dielectric material 254 is located between the first side 260 and the second portion 226 of the trailing side 222 of the main pole 220. The first side 260 and the second side 262 are substantially parallel to the second portion 226 of the trailing side 222 of the main pole 220. The magnetic shunt blocking layer 250 includes a first side 264 and a second side 266 opposite the first side 264. The first side 264 faces the second portion 226 of the trailing side 222 of the main pole 220, and the second side 266 faces the second portion 246 of the leading side 242 of the trailing shield 240. The first side 264 and the second side 266 are substantially parallel to the second portion 226 of the trailing side 222 of the main pole 220. The heavy metal layer 252 and the magnetic shunt blocking layer 250 have the same dimensions.

The heavy metal layer 252 may be beta phase Tantalum (β-Ta), beta phase tungsten (β-W), or platinum (Pt). The magnetic shunt blocking layer 250 is a magnetic material having a substantially greater electrical resistivity than that of the heavy metal layer 252. For example, the magnetic shunt blocking layer 250 is fabricated from Fe—Co-M, where M is one or more of the following: B, Si, P, Al, Hf, Zr, Nb, Ti, Ta, Mo, Mg, Y, Cu, Cr, and Ni. In another example, the magnetic shunt blocking layer 250 is fabricated from Fe—Co-M-MeO$_x$ granular film, where Me is Si, Al, Hf, Zr, Nb, Ti, Ta, Mg, Y, or Cr and M is one or more of the following: B, Si, Al, Hf, Zr, Nb, Ti, Ta, Mo, Mg, Y, Cu, Cr, and Ni. In another example, the magnetic shunt blocking layer 250 is fabricated from (Fe—Co-M-MeO$_x$)$_n$ multilayer film, where Me is Si, Al, Hf, Zr, Nb, Ti, Ta, Mg, Y, or Cr and M is one or more of the following: B, Si, Al, Hf, Zr, Nb, Ti, Ta, Mo, Mg, Y, Cu, Cr, and Ni. In another example, the magnetic shunt blocking layer 250 is fabricated from Ni—Mn—Mg—Zn—FeO$_x$ soft ferrites. In another example, the magnetic shunt blocking layer 250 is fabricated from Fe—Co-M-(Ni—Mn—Mg—Zn—FeO$_x$) granular film, where M is one or more of the following: B, Si, P, Al, Hf, Zr, Nb, Ti, Ta, Mo, Mg, Y, Cu, Cr, and Ni. In another example, the magnetic shunt blocking layer 250 is fabricated from Fe—Co-M-(Ni—Mn—Mg—Zn—FeO$_x$)$_n$ multilayer film, where M is one or more of the following: B, Si, P, Al, Hf, Zr, Nb, Ti, Ta, Mo, Mg, Y, Cu, Cr, and Ni. In embodiment, the magnetic shunt blocking layer 250 is fabricated from Co$_{19.5}$Fe$_{53}$Hf$_8$O$_{19.5}$.

During operation, an electrical current flows through the heavy metal layer 252 in the cross-track direction, as indicated by the Z-axis. The heavy metal layer 252 has strong spin-orbit coupling, and the heavy metal layer 252 generates SOT. The SOT generated by the heavy metal layer 252 induces magnetization switching (or precession) of the magnetic shunt blocking layer 250. In some embodiments, the SOT based head has an effective spin injection efficiency (β) of about 0.3 to 0.6, about 2 to 6 times larger than that of a head using a pseudo spin-valve structure (having an effective spin injection efficiency (β) of about 0.1 to 0.30). Higher effective spin injection efficiency leads to reduced critical switching current density, which is defined by the formula:

$$J_{C0} \approx \frac{2e}{\hbar} \mu_0 M_S t \alpha (H_C + M_{eff}/2)/\beta$$

Based on this formula, the 2 to 6 times increase in effective spin injection efficiency (β) for the SOT based head leads to a reduction of the critical switching current density by 2 to 6 times, which in turn brings a higher energy efficiency. Furthermore, the magnetization switching (or precession) in the magnetic shunt blocking layer 250 reduces the magnetic flux shunting from the main pole 220 to the trailing shield 240, leading to improved write-ability and linear density. In addition, because the magnetic shunt blocking layer 250 has a substantially greater electrical resistivity than that of the heavy metal layer 252, electrical current shunting from the heavy metal layer 252 to the magnetic shunt blocking layer 250 is reduced.

Figure 3:
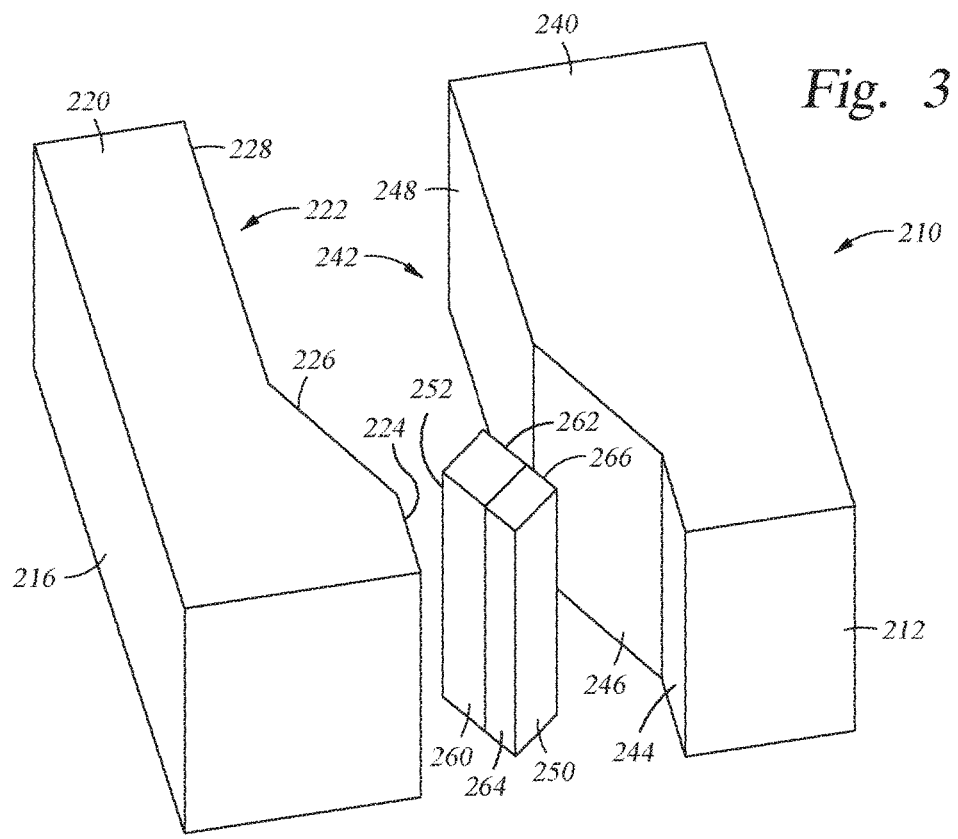
FIG. 3 is a perspective view of a portion of a write head of FIG. 2A according to one embodiment.

FIG. 3 is a perspective view of a portion of a write head of FIG. 2A according to one embodiment. The dielectric material 254 is omitted in FIG. 3 for better illustration. As shown in FIG. 3, the heavy metal layer 252 and the magnetic shunt blocking layer 250 are disposed between the main pole 220 and the trailing shield 240. The first side 260 of the heavy metal layer 252 faces the second portion 226 of the trailing side 222 of the main pole 220, and the second side 262 faces the second portion 246 of the leading side 242 of the trailing shield 240. The first side 264 of the magnetic shunt blocking layer 250 faces the second portion 226 of the trailing side 222 of the main pole 220, and the second side 266 faces the second portion 246 of the leading side 242 of the trailing shield 240. The heavy metal layer 252 and the magnetic shunt blocking layer 250 have the same dimensions.

Figure 4:
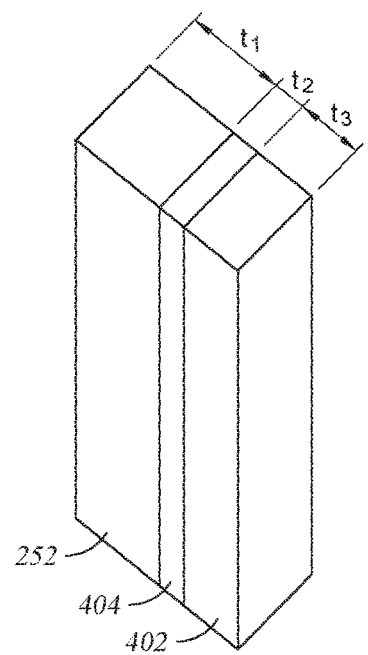
FIG. 4 is a perspective view of a heavy metal layer, a magnetic layer, and an intermediate layer according to one embodiment.

FIG. 4 is a perspective view of the heavy metal layer 252, a magnetic layer 402, and an intermediate layer 404 according to one embodiment. The magnetic layer 402 may have the same magnetic properties as the magnetic shunt blocking layer 250. The electrical resistivity of the magnetic layer 402 is substantially lower than that of the heavy metal layer 252. The magnetic layer 402 may be CoFe alloy, NiFe alloy, CoFeB alloy or half-metals. Because the electrical resistivity of the magnetic layer 402 is substantially lower than that of the heavy metal layer 252, the intermediate layer 404 is disposed between the heavy metal layer 252 and the magnetic layer 402 to block current shunting from the heavy metal layer 252 to the magnetic layer 402. The intermediate layer 404 is fabricated from the same material as the magnetic shunt blocking layer 250. The intermediate layer 404 has a substantially greater electrical resistivity than that of the heavy metal layer 252. The heavy metal layer 252 has a thickness $t_1$, the intermediate layer 404 has a thickness $t_2$, and the magnetic layer 402 has a thickness $t_3$. The thickness $t_2$ is smaller than the thickness $t_1$ or the thickness $t_3$. In one embodiment, the thickness $t_1$ is substantially greater than the thickness $t_3$.

Figure 5:
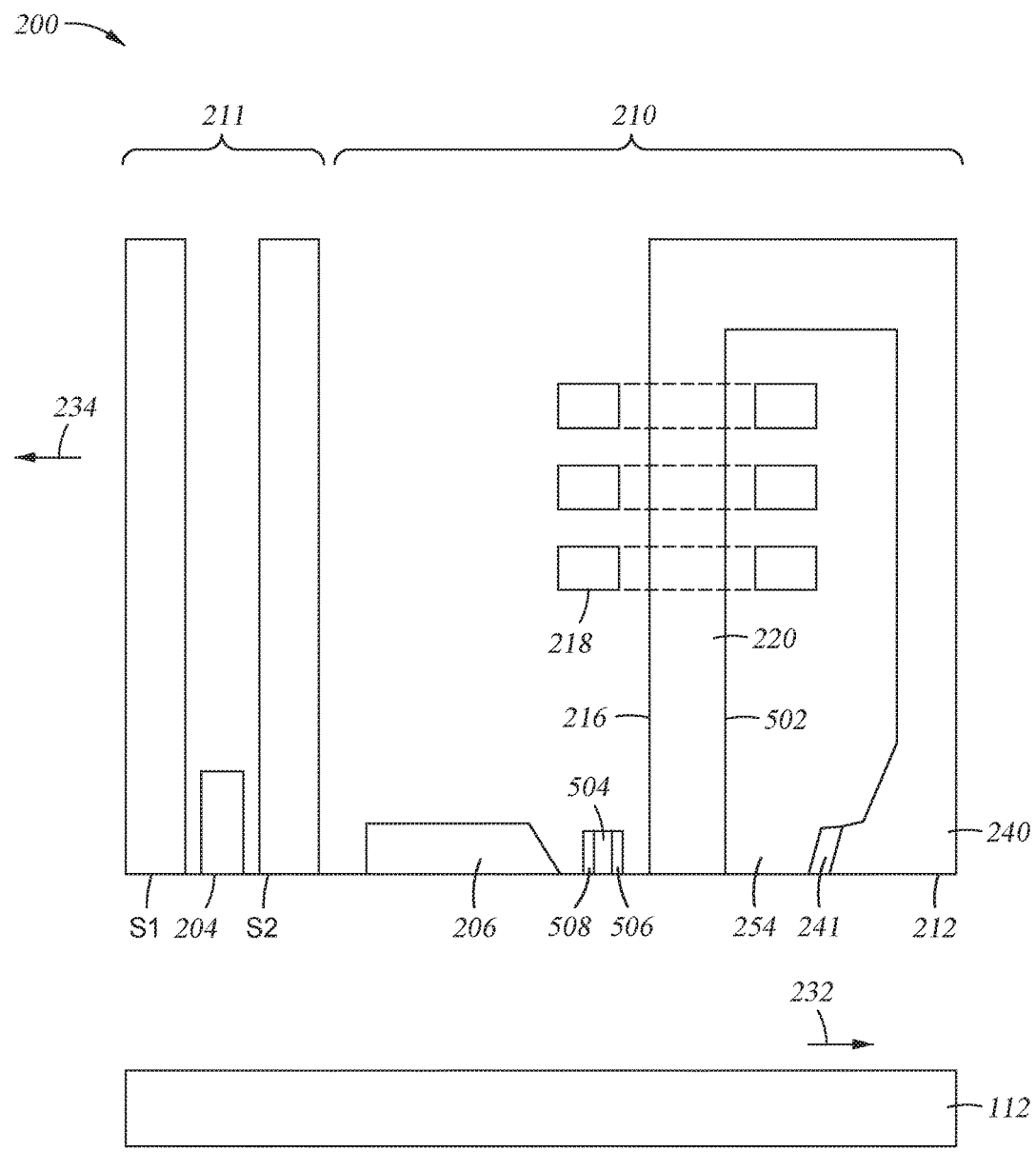
FIG. 5 is a fragmented, cross sectional side view of a read/write head facing a magnetic disk according to another embodiment.

FIG. 5 is a fragmented, cross sectional side view of the read/write head 200 facing the magnetic disk 112 according to another embodiment. As shown in FIG. 5, the read/write head 200 includes the MFS 212, the read head 211 and the write head 210. The write head 210 includes the main pole 220, the leading shield 206, and the trailing shield 240. The main pole 220 includes the leading side 216 and a trailing side 502. The trailing side 502 is substantially perpendicular to the MFS 212. In some embodiments, the trailing side 502 and the leading side 216 both include a taper. A trailing shield hot seed layer 241 is coupled to the trailing shield 240, and the trailing shield hot seed layer 241 faces the main pole 220. The write head 210 further includes a heavy metal structure 504 surrounding two or more surfaces of the main pole 220 at the MFS, a first magnetic structure 506 coupled to the heavy metal structure 504, and a second magnetic structure 508 coupled to the heavy metal structure 504. The heavy metal structure 504 is sandwiched between the first magnetic structure 506 and the second magnetic structure 508. The heavy metal structure 504 is fabricated from the same material as the heavy metal layer 252. Each of the first and second magnetic structures is fabricated from a material having a magnetic moment of 1.2 tesla or greater. In one embodiment, the heavy metal structure 504 has a substantially lower electrical resistivity than that of the first and second magnetic structures 506, 508, and there is no current shunting from the heavy metal structure 504 to the first and second magnetic structures 506, 508. In one embodiment, the heavy metal structure 504 is fabricated from Pt, and each of the first and second magnetic structures 506, 508 is fabricated from $Ni_{45}Fe_{55}$.

Figure 6A:
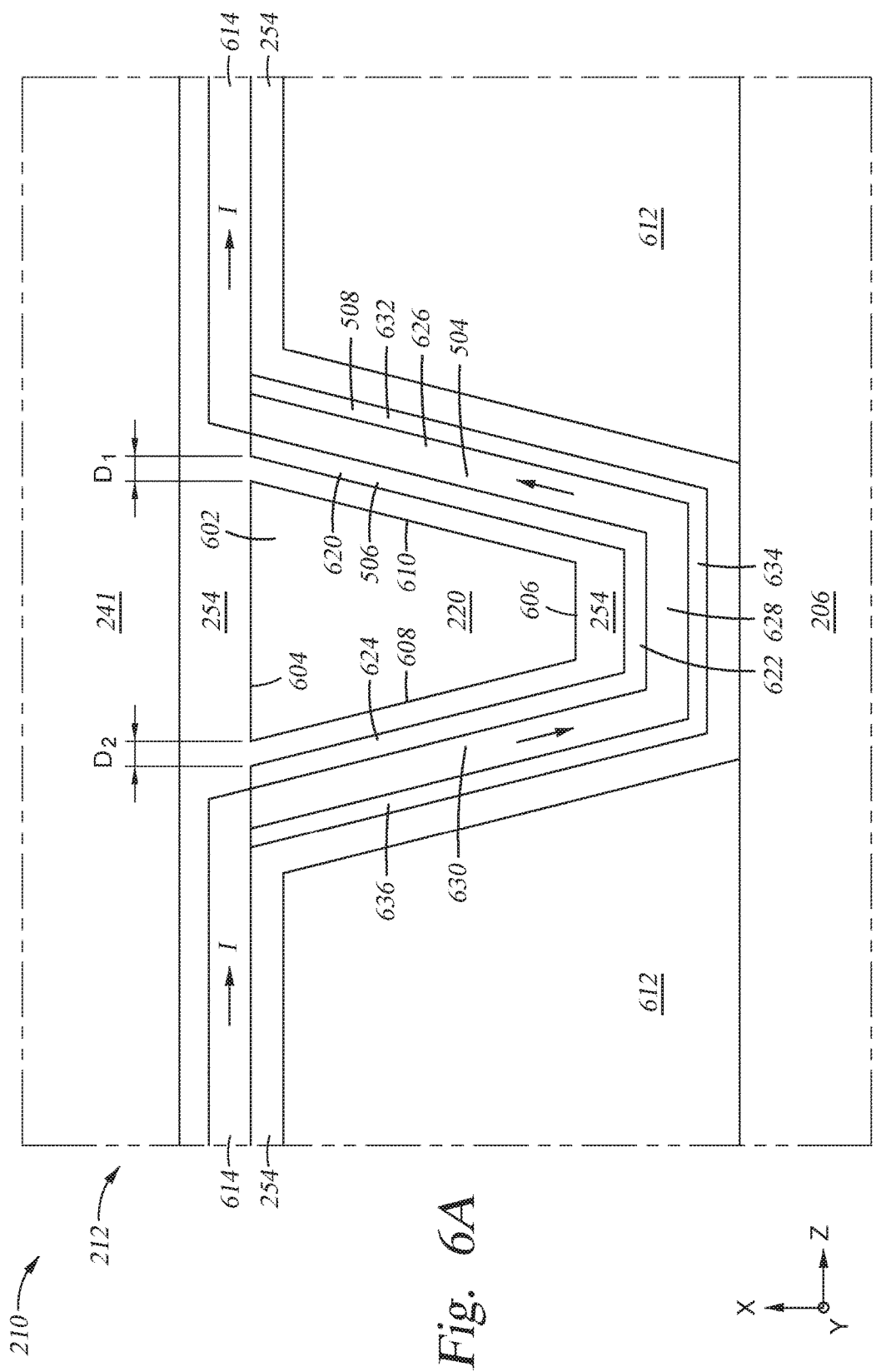

FIGS. 6A-6B are MFS views of a portion of the write head 210 of FIG. 5 according to embodiments. As shown in FIG. 6A, the write head 210 includes the trailing shield hot seed layer 241, the main pole 220, side shields 612, and the leading shield 206. The write head 210 further includes the heavy metal structure 504, the first magnetic structure 506, the second magnetic structure 508, and heavy metal layers 614. Each heavy metal layer 614 is disposed between a corresponding side shield 612 and the trailing shield hot seed layer 241. Each of the heavy metal layers 614 is in contact with the heavy metal structure 504 and the second magnetic structure 508. The heavy metal layers 614 are fabricated from the same material as the heavy metal structure 504. The heavy metal layers 614 are not in contact with the first magnetic structure 506. The heavy metal layers 614 are not in contact with the trailing shield hot seed layer 241 or the side shields 612. The dielectric material 254 is disposed between the heavy metal layers 614 and the trailing shield hot seed layer 241 and between the heavy metal layers 614 and the side shields 612. The heavy metal layers 614 are not disposed between the main pole 220 and the trailing shield hot seed layer 241. In other words, only the dielectric material 254 is disposed between the main pole 220 and the trailing shield hot seed layer 241.

The main pole 220 includes a first surface 602 at the MFS 212, a second surface 604 connected to the first surface 602, a third surface 606 opposite the second surface 604, a fourth surface 608 connecting the second surface 604 and the third surface 606, and a fifth surface 610 opposite the fourth surface 608. At least a portion of the main pole 220 at the MFS 212 is surrounded by the heavy metal structure 504 and the first and second magnetic structures 506, 508. In one embodiment, the heavy metal structure 504 and the first and second magnetic structures 506, 508 surround the third, fourth, and fifth surfaces 606, 608, 610 of the main pole 220, as shown in FIG. 6A. The second surface 604 of the main pole 220 is not surrounded by the heavy metal structure 504 and the first and second magnetic structures 506, 508, and the second surface 604 faces the trailing shield hot seed layer 241 with the dielectric material 254 disposed therebetween.

The heavy metal structure 504 and the first and second magnetic structures 506, 508 are all located at the MFS 212. The first magnetic structure 506 is the closest to the main pole 220. The first magnetic structure 506 includes a first portion 620, a second portion 622 adjacent the first portion 620, and a third portion 624 opposite the first portion 620. The first portion 620 is disposed between the fifth surface 610 of the main pole 220 and one of the side shields 612, the second portion 622 is disposed between the third surface 606 of the main pole 220 and the leading shield 206, and the third portion 624 is disposed between the fourth surface 608 main pole 220 and the other side shield 612. The first portion 620 faces the fifth surface 610 of the main pole 220 and is substantially parallel to the fifth surface 610 of the main pole 220. The dielectric material 254 is disposed between the first portion 620 and the fifth surface 610 of the main pole 220. The second portion 622 faces the third surface 606 of the main pole 220 and is substantially parallel to the third surface 606 of the main pole 220. The dielectric material 254 is located between the second portion 622 and the third surface 606 of the main pole 220. The third portion 624 faces the fourth surface 608 of the main pole 220 and is substantially parallel to the fourth surface 608 of the main pole 220. The dielectric material 254 is located between the third portion 624 and the fourth surface 608 of the main pole 220.

The heavy metal structure 504 is coupled to the first magnetic structure 506. The heavy metal structure 504 includes a first portion 626, a second portion 628 adjacent the first portion 626, and a third portion 630 opposite the first portion 626. The first portion 626 is disposed between the first portion 620 of the first magnetic structure 506 and one of the side shield 612, the second portion 628 is disposed between the second portion 622 of the first magnetic structure 506 and the leading shield 206, and the third portion 630 is disposed between the third portion 624 of the first magnetic structure 506 and the other side shield 612. The first portion 626 is in contact with the first portion 620 of the first magnetic structure 506, the second portion 628 is in contact with the second portion 622 of the first magnetic structure 506, and the third portion 630 is in contact with the third portion 624 of the first magnetic structure 506.

The second magnetic structure 508 is coupled to the heavy metal structure 504. The second magnetic structure 508 includes a first portion 632, a second portion 634 adjacent the first portion 632, and a third portion 636 opposite the first portion 632. The first portion 632 is disposed between the first portion 626 of the heavy metal structure 504 and one of the side shield 612, the second portion 634 is disposed between the second portion 628 of the heavy metal structure 504 and the leading shield 206, and the third portion 636 is disposed between the third portion 630 of the heavy metal structure 504 and the other side shield 612. The first portion 632 is in contact with the first portion 626 of the heavy metal structure 504, the second portion 634 is in contact with the second portion 628 of the heavy metal structure 504, and the third portion 636 is in contact with the third portion 630 of the heavy metal structure 504. The heavy metal structure 504 is sandwiched between the first magnetic structure 506 and the second magnetic structure 508. The first portion 626 of the heavy metal structure 504 is sandwiched between the first portion 620 of the first magnetic structure 506 and the first portion 632 of the second magnetic structure 508, the second portion 628 of the heavy metal structure 504 is sandwiched between the second portion 622 of the first magnetic structure 506 and the second portion 634 of the second magnetic structure 508, and the third portion 630 of the heavy metal structure 504 is sandwiched between the third portion 624 of the first magnetic structure 506 and the third portion 636 of the second magnetic structure 508.

The first portion 620 of the first magnetic structure 506 is a distance $D_1$ away from the fifth surface 610 of the main pole 220. The distance $D_1$ ranges from about 5 nm to about 9 nm, such as about 7 nm. The third portion 624 of the first magnetic structure 506 is a distance $D_2$ away from the fourth surface 608 of the main pole 220. The distance $D_2$ is substantially the same as the distance $D_1$. The first portion 620 of the first magnetic structure 506 has a thickness in the cross-track direction, as indicated by the Z-axis, and the thickness ranges from about 3 nm to about 7 nm, such as about 5 nm. The second portion 622 of the first magnetic structure 506 has a thickness in the down-track direction, as indicated by the X-axis, and the thickness is substantially similar to the thickness of the first portion 620. The third portion 624 of the first magnetic structure 506 has a thickness in the cross-track direction, as indicated by the Z-axis, and the thickness is substantially similar to the thickness of the first portion 620. The first magnetic structure 506 has a substantially uniform thickness. The first portion 626 of the heavy metal structure 504 has a thickness in the cross-track direction, as indicated by the Z-axis, and the thickness ranges from about 4 nm to about 8 nm, such as about 6 nm. The second portion 628 of the heavy metal structure 504 has a thickness in the down-track direction, as indicated by the X-axis, and the thickness is substantially similar to the thickness of the first portion 626. The third portion 630 of the heavy metal structure 504 has a thickness in the cross-track direction, as indicated by the Z-axis, and the thickness is substantially similar to the thickness of the first portion 626. The heavy metal structure 504 has a substantially uniform thickness. The first portion 632 of the second magnetic structure 508 has a thickness in the cross-track direction, as indicated by the Z-axis, and the thickness is substantially similar to the thickness of the first portion 626 of the first magnetic structure 506. The second portion 634 of the second magnetic structure 508 has a thickness in the down-track direction, as indicated by the X-axis, and the thickness is substantially similar to the thickness of the first portion 632. The third portion 636 of the second magnetic structure 508 has a thickness in the cross-track direction, as indicated by the Z-axis, and the thickness is substantially similar to the thickness of the first portion 632. The second magnetic structure 508 has a substantially uniform thickness. The first portions 620, 626, 632 and the third portions 624, 630, 636 each have a first length in the down-track direction, as indicated by the X-axis. The first length is substantially greater than a second length (in the down-track direction) of the first surface 602 of the main pole. In one embodiment, the first length is about 150 nm.

In one embodiment, the heavy metal structure 504 is fabricated from Pt, and the first and second magnetic structures 506, 508 are fabricated from $Ni_{45}Fe_{55}$, which has an electrical resistivity substantially greater than that of Pt. During operation, an electrical current (I) flows from the preamp (not shown) to one of the heavy metal layers 614, and the electrical current (I) flows through the heavy metal structure 504 to the other heavy metal layer 614, as shown in FIG. 6A. The other heavy metal layer 614 may be connected to the preamp (not shown). Because the electrical resistivity of the heavy metal layer 614 and the heavy metal structure 504 is substantially lower than that of the first and second magnetic structures 506, 508, there is no current shunting from the heavy metal structure 504 to the main pole 220. In some embodiments, the heavy metal layers 614 and the heavy metal structure 504 are fabricated from a material having a substantially greater electrical resistivity than that of the first and second magnetic structures 506, 508, and a magnetic shunt blocking structure may be disposed between the heavy metal structure 504 and the first magnetic structure 506 and between the heavy metal structure 504 and the second magnetic structure 508.

FIG. 6B is a MFS view of a portion of the write head 210 of FIG. 5 according to another embodiment. The write head 210 shown in FIG. 6B is similar to the write head 210 shown in FIG. 6A, except with the addition of one or more magnetic shunt blocking structures. As shown in FIG. 6B, a first magnetic shunt blocking structure 640 is disposed between the first magnetic structure 506 and the heavy metal structure 504, and a second magnetic shunt blocking structure 642 is disposed between the heavy metal structure 504 and the second magnetic structure 508. In one embodiment, the heavy metal layers 614 and the heavy metal structure 504 are fabricated from a material having a substantially greater electrical resistivity than that of the first and second magnetic structures 506, 508, and the first and second magnetic shunt blocking structures 640, 642 are fabricated from a material having a substantially greater electrical resistivity than that of the heavy metal layers 614 and the heavy metal structure 504. The magnetic shunt blocking structures 640, 642 are fabricated from the same material as the magnetic shunt blocking layer 250. In one embodiment, the first and second magnetic structures 506, 508 are fabricated from $Ni_{45}Fe_{55}$, the heavy metal layers 614 and the heavy metal structure 504 are fabricated from β-Ta or β-W, and the first and second magnetic shunt blocking structures 640, 642 are fabricated from $Co_{19.5}Fe_{53}Hf_8O_{19.5}$. The first and second magnetic shunt blocking structures 640, 642 reduce current shunting from the heavy metal structure 504 to the main pole 220.

The first magnetic shunt blocking structure 640 is sandwiched between the first magnetic structure 506 and the heavy metal structure 504. The first magnetic shunt blocking structure 640 includes a first portion 644, a second portion 648 adjacent the first portion 644, and a third portion 652 opposite the first portion 644. The first portion 644 of the first magnetic shunt blocking structure 640 is sandwiched between the first portion 620 of the first magnetic structure 506 and the first portion 626 of the heavy metal structure 504, the second portion 648 of the first magnetic shunt blocking structure 640 is sandwiched between the second portion 622 of the first magnetic structure 506 and the second portion 628 of the heavy metal structure 504, and the third portion 652 of the first magnetic shunt blocking structure 640 is sandwiched between the third portion 624 of the first magnetic structure 506 and the third portion 630 of the heavy metal structure 504. The first portion 644 of the first magnetic shunt blocking structure 640 has a thickness in the cross-track direction, as indicated by the Z-axis, and the thickness ranges from about a few Angstroms to about 2 nm, such as about 1 nm. The second portion 648 of the first magnetic shunt blocking structure 640 has a thickness in the down-track direction, as indicated by the X-axis, and the thickness is substantially similar to the thickness of the first portion 644. The third portion 652 of the first magnetic shunt blocking structure 640 has a thickness in the cross-track direction, as indicated by the Z-axis, and the thickness is substantially similar to the thickness of the first portion 644. The first magnetic shunt blocking structure 640 has a substantially uniform thickness.

The second magnetic shunt blocking structure 642 is sandwiched between the second magnetic structure 508 and the heavy metal structure 504. The second magnetic shunt blocking structure 642 includes a first portion 646, a second portion 650 adjacent the first portion 646, and a third portion 654 opposite the first portion 646. The first portion 646 of the second magnetic shunt blocking structure 642 is sandwiched between the first portion 632 of the second magnetic structure 508 and the first portion 626 of the heavy metal structure 504, and the first portion 646 of the second magnetic shunt blocking structure 642 is also disposed between the first portion 632 of the second magnetic structure 508 and the heavy metal layer 614. The second portion 650 of the second magnetic shunt blocking structure 642 is sandwiched between the second portion 634 of the second magnetic structure 508 and the second portion 628 of the heavy metal structure 504, and the third portion 654 of the second magnetic shunt blocking structure 642 is sandwiched between the third portion 636 of the second magnetic structure 508 and the third portion 630 of the heavy metal structure 504. The third portion 654 of the second magnetic shunt blocking structure 642 is also disposed between the third portion 636 of the second magnetic structure 508 and the heavy metal layer 614. The first portion 646 of the second magnetic shunt blocking structure 642 has a thickness in the cross-track direction, as indicated by the Z-axis, and the thickness ranges from about a few Angstroms to about 2 nm, such as about 1 nm. The second portion 650 of the second magnetic shunt blocking structure 642 has a thickness in the down-track direction, as indicated by the X-axis, and the thickness is substantially similar to the thickness of the first portion 646. The third portion 654 of the second magnetic shunt blocking structure 642 has a thickness in the cross-track direction, as indicated by the Z-axis, and the thickness is substantially similar to the thickness of the first portion 646. The second magnetic shunt blocking structure 642 has a substantially uniform thickness.

Figure 7B:
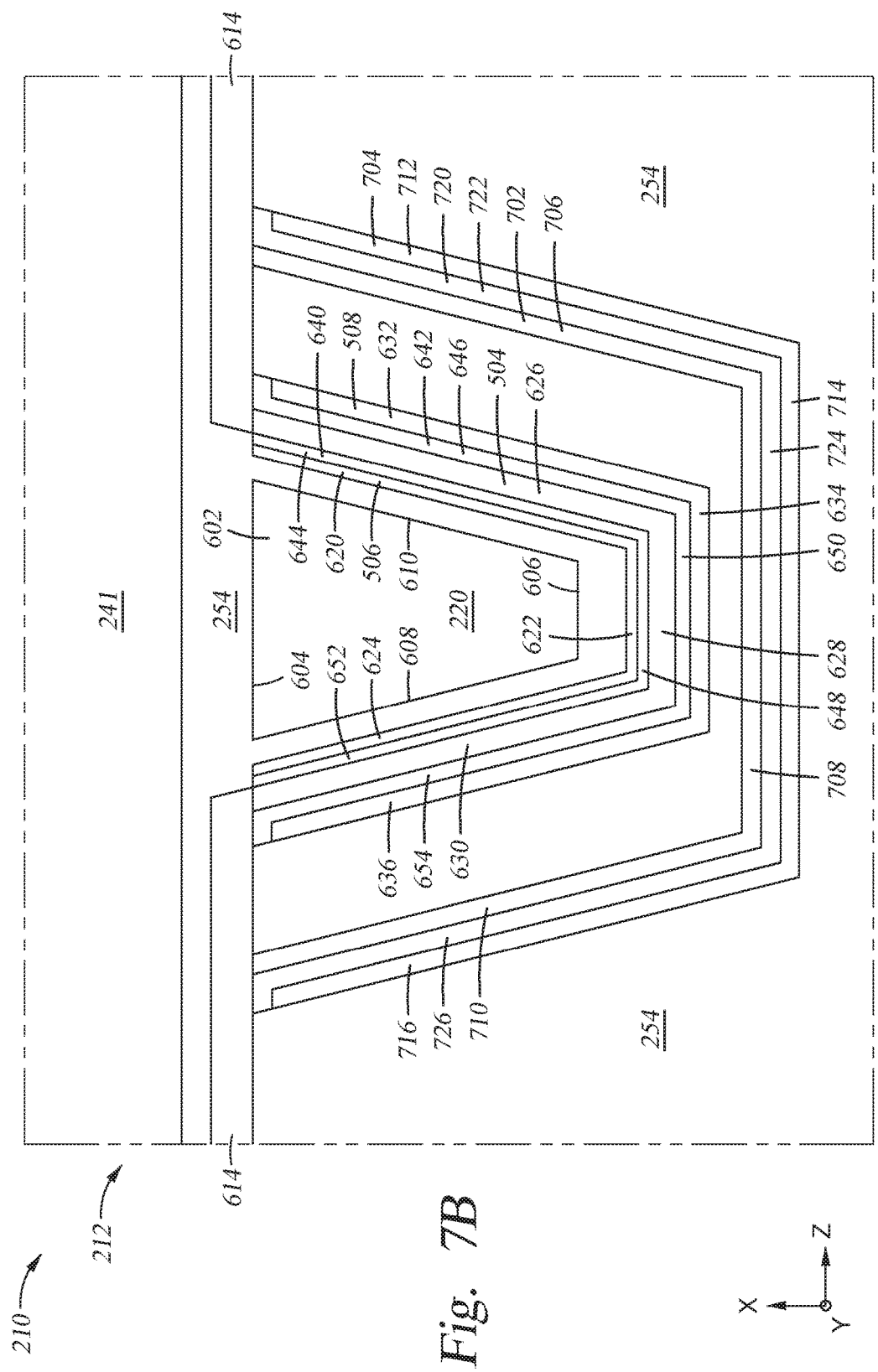

FIGS. 7A-7B are MFS views of a portion of the write head 210 of FIG. 5 according to embodiments. As shown in FIG. 7A, the write head 210 includes the trailing shield hot seed layer 241, the main pole 220, and the heavy metal structure 504 sandwiched between the first magnetic structure 506 and the second magnetic structure 508. The write head 210 further includes a second heavy metal structure 702 surrounding the second magnetic structure 508 and the third magnetic structure 704 coupled to the second heavy metal structure 702. The second heavy metal structure 702 and the third magnetic structure 704 replace the side shields 612 and the leading shield 206. The second heavy metal structure 702 is fabricated from the same material as the heavy metal structure 504, and the third magnetic structure 704 is fabricated from the same material as the first and second magnetic structures 506, 508. In one embodiment, the electrical resistivity of the second heavy metal structure 702 is substantially lower than that of the third magnetic structure 704.

The second heavy metal structure 702 includes a first portion 706, a second portion 708 adjacent the first portion 706, and a third portion 710 opposite the first portion 706. The first portion 706 faces the first portion 632 of the second magnetic structure 508 and is substantially parallel to the first portion 632 of the second magnetic structure 508. The dielectric material 254 is disposed between the first portion 706 and the first portion 632 of the second magnetic structure 508. A distance $D_3$ is between the first portion 706 of the second heavy metal structure 702 and the first portion 632 of the second magnetic structure 508, and the distance $D_3$ ranges from about 20 nm to about 40 nm, such as about 30 nm. The first portion 706 has a thickness in the cross-track direction, as indicated by the Z-axis, and the thickness of the first portion 706 is substantially the same as the thickness of the first portion 626 of the heavy metal structure 504. The second portion 708 faces the second portion 634 of the second magnetic structure 508 and is substantially parallel to the second portion 634 of the second magnetic structure 508. The dielectric material 254 is located between the second portion 708 and the second portion 634 of the second magnetic structure 508. A distance $D_5$ is between the second portion 708 of the second heavy metal structure 702 and the second portion 634 of the second magnetic structure 508, and the distance $D_5$ ranges from about 10 nm to about 30 nm, such as about 20 nm. The second portion 708 has a thickness in the down-track direction, as indicated by the X-axis, and the thickness of the second portion 708 is substantially the same as the thickness of the second portion 628 of the heavy metal structure 504. The third portion 710 faces the third portion 636 of the second magnetic structure 508 and is substantially parallel to the third portion 636 of the second magnetic structure 508. The dielectric material 254 is located between the third portion 710 and the third portion 636 of the second magnetic structure 508. A distance $D_4$ is between the third portion 710 of the second heavy metal structure 702 and the third portion 636 of the second magnetic structure 508, and the distance $D_4$ ranges from about 20 nm to about 40 nm, such as about 30 nm. The third portion 710 has a thickness in the cross-track direction, as indicated by the Z-axis, and the thickness of the third portion 710 is substantially the same as the thickness of the third portion 630 of the heavy metal structure 504. The second heavy metal structure 702 has a substantially uniform thickness. The first and third portions 706, 710 of the second heavy metal structure 702 are in contact with the heavy metal layers 614.

The third magnetic structure 704 is coupled to the second heavy metal structure 702. The third magnetic structure 704 includes a first portion 712, a second portion 714 adjacent the first portion 712, and a third portion 716 opposite the first portion 712. The first portion 712 is in contact with the first portion 706 of the second heavy metal structure 702, the second portion 714 is in contact with the second portion 708 of the second heavy metal structure 702, and the third portion 716 is in contact with the third portion 710 of the second heavy metal structure 702. The first portion 712 has a thickness in the cross-track direction, as indicated by the Z-axis, and the thickness of the first portion 712 is substantially the same as the thickness of the first portion 620 of the first magnetic structure 506. The second portion 714 has a thickness in the down-track direction, as indicated by the X-axis, and the thickness of the second portion 714 is substantially the same as the thickness of the second portion 622 of the first magnetic structure 506. The third portion 716 has a thickness in the cross-track direction, as indicated by the Z-axis, and the thickness of the third portion 716 is substantially the same as the thickness of the third portion 624 of the first magnetic structure 506.

In one embodiment, the heavy metal structure 504 and the second heavy metal structure 702 are fabricated from Pt, and the first, second, and third magnetic structures 506, 508, 704 are fabricated from $Ni_{45}Fe_{55}$, which has an electrical resistivity substantially greater than that of Pt. During operation, an electrical current (I) flows from the preamp (not shown) to one of the heavy metal layers 614, and the electrical current (I) flows through the heavy metal structure 504 and the second heavy metal structure 702 to the other heavy metal layer 614, as shown in FIG. 7A. The other heavy metal layer 614 may be connected to the preamp (not shown).

Because the electrical resistivity of the heavy metal layer 614, the heavy metal structure 504, and the second heavy metal structure 702 is substantially lower than that of the first, second, and third magnetic structures 506, 508, 704, there is no current shunting from the heavy metal structure 504 to the main pole 220. In some embodiments, the heavy metal layers 614, the heavy metal structure 504, and the second heavy metal structure 702 are fabricated from a material having a substantially greater electrical resistivity than that of the first, second, and third magnetic structures 506, 508, 704, and a magnetic shunt blocking structure may be disposed between the heavy metal structure 504 and the first magnetic structure 506, between the heavy metal structure 504 and the second magnetic structure 508, and between the second heavy metal structure 702 and the third magnetic structure 704.

FIG. 7B is a MFS view of a portion of the write head 210 of FIG. 5 according to another embodiment. The write head 210 shown in FIG. 7B is similar to the write head 210 shown in FIG. 7A, except with the addition of one or more magnetic shunt blocking structures. As shown in FIG. 7B, a third magnetic shunt blocking structure 720 is disposed between the third magnetic structure 704 and the second heavy metal structure 702. In one embodiment, the heavy metal layers 614, the heavy metal structure 504, and the second heavy metal structure 702 are fabricated from a material having a substantially greater electrical resistivity than that of the first, second, and third magnetic structures 506, 508, 704, and the first, second, and third magnetic shunt blocking structures 640, 642, 720 are fabricated from a material having a substantially greater electrical resistivity than that of the heavy metal layers 614, the heavy metal structure 504, and the second heavy metal structure 702. The magnetic shunt blocking structure 720 is fabricated from the same material as the magnetic shunt blocking structures 640, 642. In one embodiment, the first, second, and third magnetic structures 506, 508, 704 are fabricated from $Ni_{45}Fe_{55}$, the heavy metal layers 614, the heavy metal structure 504, and the second heavy metal structure 702 are fabricated from β-Ta or β-W, and the first, second, and third magnetic shunt blocking structures 640, 642, 720 are fabricated from $Co_{19.5}Fe_{53}Hf_8O_{19.5}$. The first, second, and third magnetic shunt blocking structures 640, 642, 720 reduce current shunting from the heavy metal structures 504, 702 to the main pole 220.

The third magnetic shunt blocking structure 720 is sandwiched between the third magnetic structure 704 and the second heavy metal structure 702. The third magnetic shunt blocking structure 720 includes a first portion 722, a second portion 724 adjacent the first portion 722, and a third portion 726 opposite the first portion 722. The first portion 722 of the third magnetic shunt blocking structure 720 is sandwiched between the first portion 712 of the third magnetic structure 704 and the first portion 706 of the second heavy metal structure 702, the second portion 724 of the third magnetic shunt blocking structure 720 is sandwiched between the second portion 714 of the third magnetic structure 704 and the second portion 708 of the second heavy metal structure 702, and the third portion 726 of the third magnetic shunt blocking structure 720 is sandwiched between the third portion 716 of the third magnetic structure 704 and the third portion 710 of the second heavy metal structure 702. The first portion 722 of the third magnetic shunt blocking structure 720 has a thickness in the cross-track direction, as indicated by the Z-axis, and the thickness ranges from about a few Angstroms to about 2 nm, such as about 1 nm. The second portion 724 of the third magnetic shunt blocking structure 720 has a thickness in the down-track direction, as indicated by the X-axis, and the thickness is substantially similar to the thickness of the first portion 722. The third portion 726 of the third magnetic shunt blocking structure 720 has a thickness in the cross-track direction, as indicated by the Z-axis, and the thickness is substantially similar to the thickness of the first portion 722. The third magnetic shunt blocking structure 720 has a substantially uniform thickness.

Figure 8B:
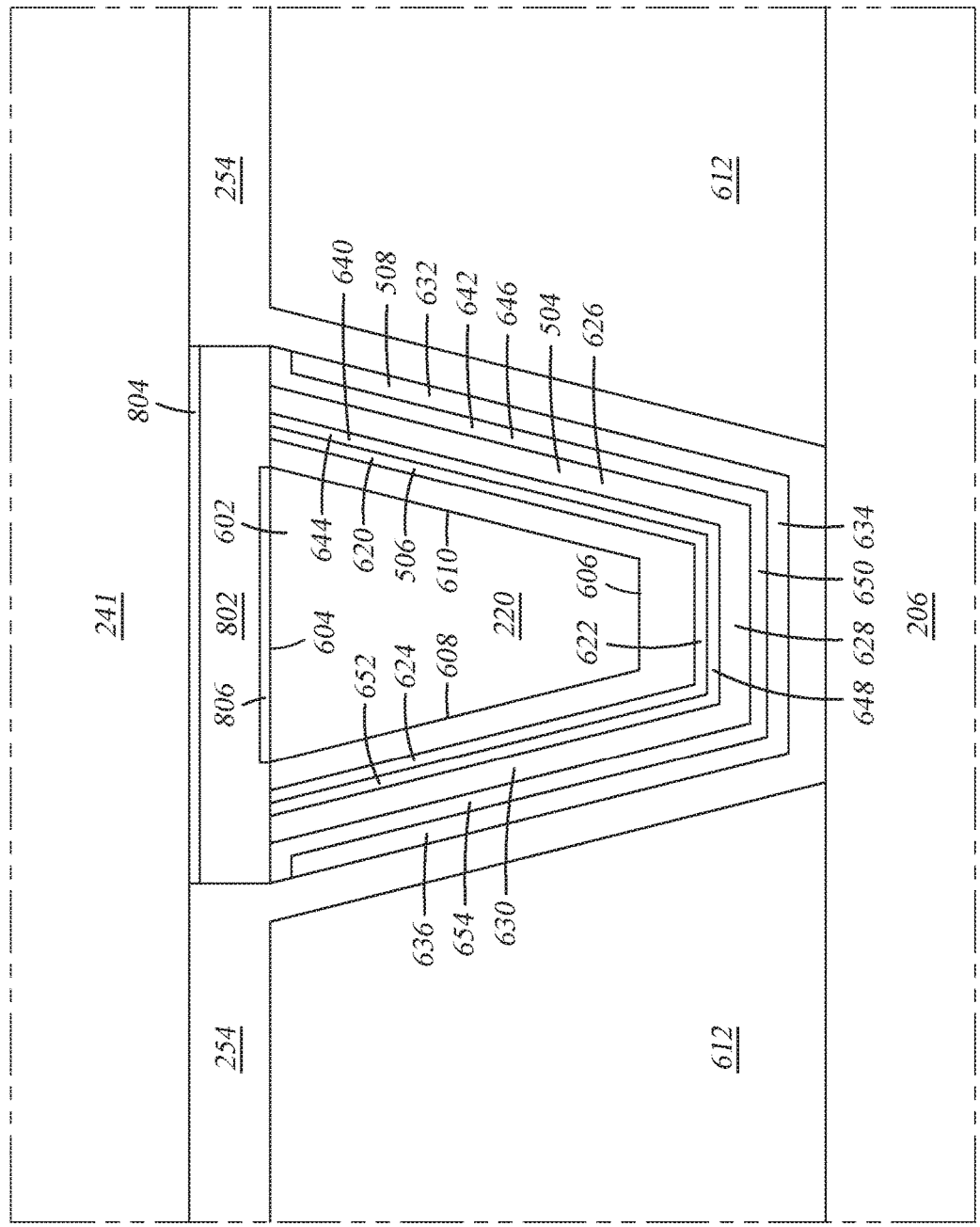

FIGS. 8A-8B are MFS views of a portion of the write head 210 of FIG. 5 according to embodiments. The write head 210 shown in FIG. 8A is similar to the write head 210 shown in FIG. 6A, except the heavy metal layers 614 are replaced with a heavy metal layer and two magnetic shunt blocking layers disposed between the main pole 220 and the trailing shield hot seed layer 241. As shown in FIG. 8A, the write head 210 includes the trailing shield hot seed layer 241, the main pole 220, the heavy metal structure 504 sandwiched between the first magnetic structure 506 and the second magnetic structure 508, the side shields 612, and the leading shield 206. The write head 210 further includes a heavy metal layer 802 disposed between the main pole 220 and the trailing shield hot seed layer 241, a magnetic shunt blocking layer 804 disposed between the heavy metal layer 802 and the trailing shield hot seed layer 241, and a magnetic shunt blocking layer 806 disposed between the heavy metal layer 802 of the main pole 220. Because the heavy metal layer 802 has an electrical resistivity that is substantially greater than that of the main pole 220 or the trailing shield hot seed layer 241, the magnetic shunt blocking layers 804, 806 are utilized. The heavy metal layer 802 is fabricated from Pt, β-Ta, or β-W. The heavy metal layer 802 may be fabricated from the same material as the heavy metal structure 504, or fabricated from a different material than the heavy metal structure 504. The magnetic shunt blocking layers 804, 806 are fabricated from the same material. In one embodiment, the magnetic shunt blocking layers 804, 806 are fabricated from $Fe_{55}Hf_{17}O_{28}$ or Co—Zr—O. In other embodiments, the magnetic shunt blocking layers 804, 806 are fabricated from the same material as the magnetic shunt blocking layer 250.

The heavy metal layer 802 is in contact with the heavy metal structure 504, the first magnetic structure 506, and the second magnetic structure 508. The heavy metal layer 802 is not in contact with the trailing shield hot seed layer 241 or the main pole 220. The magnetic shunt blocking layer 804 is in contact with the trailing shield hot seed layer 241 and the heavy metal layer 802. The magnetic shunt blocking layer 806 is in contact with the main pole 220 and the heavy metal layer 802. The heavy metal layer 802 is not between the trailing shield hot seed layer 241 and the side shields 612. The heavy metal layer 802 has a width in the cross-track direction, as indicated by the Z-axis. The magnetic shunt blocking layers 804, 806 each have a width in the cross-track direction. The width of the magnetic shunt blocking layer 804 is substantially the same as the width of the heavy metal layer 802. The width of the magnetic shunt blocking layer 806 is substantially less than the width of the heavy metal layer 802. The width of the magnetic shunt blocking layer 806 is substantially the same as a width (in the cross-track direction) of the surface 604 of the main pole 220 at the MFS.

During operation, an electrical current (I) flows from the preamp (not shown) to a first location of the heavy metal layer 802 or the heavy metal structure 504 via a first lead (not shown), and the electrical current (I) flows through the heavy metal layer 802 or the heavy metal structure 504 in a counter-clockwise direction, as shown in FIG. 8A. The electrical current (I) exits the heavy metal layer 802 or the heavy metal structure 504 at a second location of the heavy metal layer 802 or the heavy metal structure 504 via a second lead (not shown), which is electrically connected to the preamp (not shown).

FIG. 8B is a MFS view of a portion of the write head 210 of FIG. 5 according to another embodiment. The write head 210 shown in FIG. 8B is similar to the write head 210 shown in FIG. 8A, except with the addition of the magnetic shunt blocking structures 640, 642. In one embodiment, the heavy metal structure 504 is fabricated from a material having a substantially greater electrical resistivity than that of the first and second magnetic structures 506, 508, and the first and second magnetic shunt blocking structures 640, 642 are fabricated from a material having a substantially greater electrical resistivity than that of the heavy metal structure 504. The first and second magnetic shunt blocking structures 640, 642 reduce current shunting from the heavy metal structure 504 to the main pole 220.

Figure 9A:
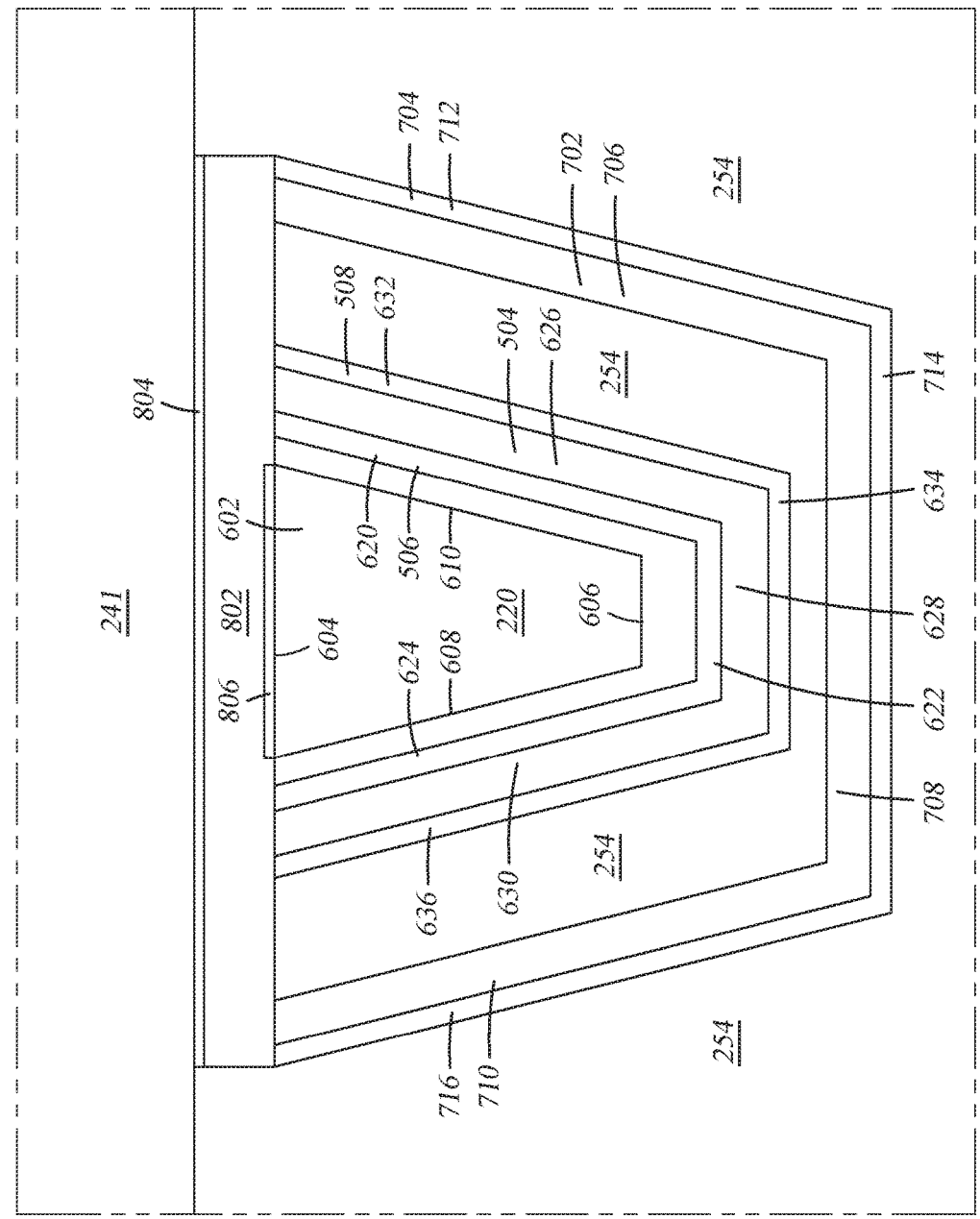
FIGS. 9A-9B are MFS views of a portion of the write head of FIG. 5 according to embodiments.
Figure 9B:
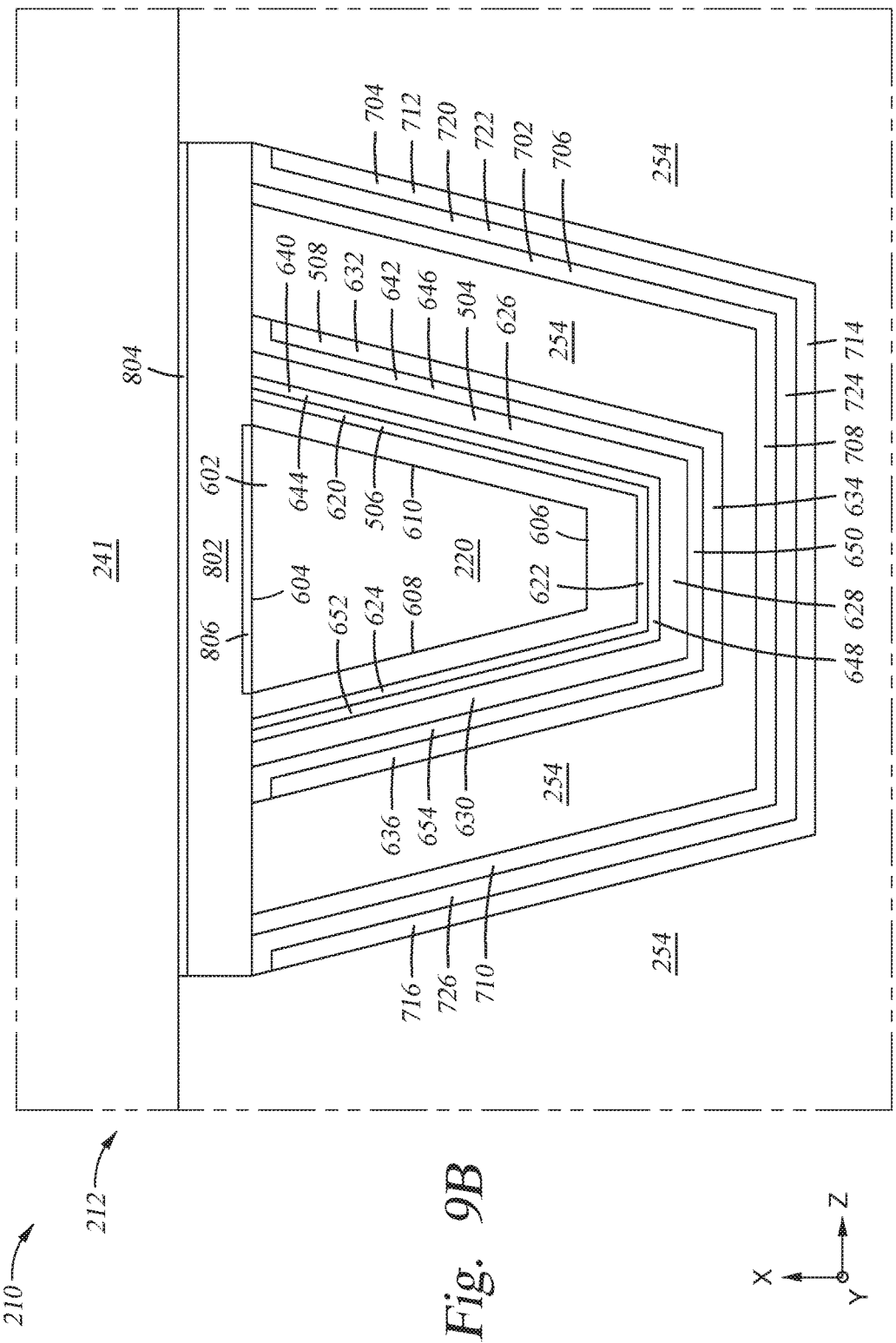

FIGS. 9A-9B are MFS views of a portion of the write head 210 of FIG. 5 according to embodiments. The write head 210 shown in FIG. 9A is similar to the write head 210 shown in FIG. 7A, except the heavy metal layers 614 are replaced with the heavy metal layer 802 and two magnetic shunt blocking layers 804, 806 disposed between the main pole 220 and the trailing shield hot seed layer 241. As shown in FIG. 9A, the write head 210 includes the trailing shield hot seed layer 241, the main pole 220, and the heavy metal structure 504 sandwiched between the first magnetic structure 506 and the second magnetic structure 508, the second heavy metal structure 702, the third magnetic structure 704, the heavy metal layer 802, and two magnetic shunt blocking layers 804, 806. The heavy metal layer 802 is disposed between the trailing shield hot seed layer 241 and the main pole 220, between the trailing shield hot seed layer 241 and the heavy metal structure 504, between the trailing shield hot seed layer 241 and the first and second magnetic structures 506, 508, between the trailing shield hot seed layer 241 and the second heavy metal structure 702, and between the trailing shield hot seed layer 241 and the third magnetic structure 704. The heavy metal layer 802 is in contact with the heavy metal structures 504, 702 and the first, second, and third magnetic structures 506, 508, 704. The heavy metal layer 802 is not in contact with the trailing shield hot seed layer 241 or the main pole 220. The magnetic shunt blocking layer 804 is in contact with the trailing shield hot seed layer 241 and the heavy metal layer 802. The magnetic shunt blocking layer 806 is in contact with the main pole 220 and the heavy metal layer 802.

FIG. 9B is a MFS view of a portion of the write head 210 of FIG. 5 according to another embodiment. The write head 210 shown in FIG. 9B is similar to the write head 210 shown in FIG. 9A, except with the addition of the magnetic shunt blocking structures 640, 642, 720. In one embodiment, the heavy metal structures 504, 702 are fabricated from a material having a substantially greater electrical resistivity than that of the first, second and third magnetic structures 506, 508, 704, and the first, second, and third magnetic shunt blocking structures 640, 642, 720 are fabricated from a material having a substantially greater electrical resistivity than that of the heavy metal structure 504 or the heavy metal structure 702. The first, second, and third magnetic shunt blocking structures 640, 642, 720 reduce current shunting from the heavy metal structure 504 to the main pole 220.

The SOT based head with the magnetic structures sandwiching the heavy metal structure increases both track density (tracks per inch) and linear density (bit per inch), which in turn increases the areal density capability (ADC), which is the product of tracks per inch and bit per inch. One or more magnetic shunt blocking structures are utilized when the electrical resistivity of the heavy metal structure is greater than that of the magnetic structures. Current shunting to the main pole is reduced by the magnetic shunt blocking structures.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
a trailing shield;
a main pole;
a heavy metal layer disposed between the trailing shield and the main pole; and
a magnetic shunt blocking layer in contact with the heavy metal layer.

2. The magnetic recording head of claim 1, wherein the heavy metal layer comprises a material selected from the group consisting of beta phase Tantalum, beta phase tungsten, and platinum.

3. The magnetic recording head of claim 1, wherein the magnetic shunt blocking layer comprises a material selected from the group consisting of Fe—Co-M, Fe—Co-M-MeO$_x$ granular film, (Fe—Co-M-MeO$_x$)$_n$ multilayer film, Ni—Mn—Mg—Zn—FeO$_x$ soft ferrites, Fe—Co-M-(Ni—Mn—Mg—Zn—FeO$_x$) granular film, and Fe—Co-M-(Ni—Mn—Mg—Zn—FeO$_x$)$_n$ multilayer film, wherein M is one or more of the following: B, Si, P, Al, Hf, Zr, Nb, Ti, Ta, Mo, Mg, Y, Cu, Cr, and Ni, and Me is Si, Al, Hf, Zr, Nb, Ti, Ta, Mg, Y, or Cr.

4. The magnetic recording head of claim 1, further comprising a magnetic layer coupled to the magnetic shunt blocking layer.

5. The magnetic recording head of claim 4, wherein the magnetic layer comprises a material selected from the group consisting of CoFe alloy, NiFe alloy, and CoFeB alloy.

6. The magnetic recording head of claim 1, wherein the heavy metal layer and the magnetic shunt blocking layer are disposed at a media facing surface.

7. A magnetic recording head, comprising:
a trailing shield;
a main pole;
a heavy metal layer disposed between the trailing shield and the main pole; and
a magnetic shunt blocking layer coupled to the heavy metal layer, wherein the heavy metal layer and the magnetic shunt blocking layer are recessed from a media facing surface.

8. A magnetic recording head, comprising:
a trailing shield;
a main pole;
a heavy metal layer disposed between the trailing shield and the main pole; and
a magnetic shunt blocking layer coupled to the heavy metal layer, wherein the magnetic shunt blocking layer is in contact with the main pole.

9. A magnetic recording head, comprising:
a trailing shield hot seed layer;
a main pole;
a dielectric material disposed between the main pole and the trailing shield hot seed layer;

a first magnetic structure surrounding a portion of the main pole at a media facing surface;

a first heavy metal structure surrounding the first magnetic structure; and a second magnetic structure surrounding the first heavy metal structure, wherein the first heavy metal structure is sandwiched between the first magnetic structure and the second magnetic structure.

10. The magnetic recording head of claim 9, wherein the dielectric material is in contact with the trailing shield hot seed layer and the main pole.

11. The magnetic recording head of claim 9, wherein the first heavy metal structure comprises a material selected from the group consisting of beta phase Tantalum, beta phase tungsten, and platinum.

12. The magnetic recording head of claim 9, wherein the first magnetic structure and the second magnetic structure each comprise $Ni_{45}Fe_{55}$.

13. The magnetic recording head of claim 9, wherein the first heavy metal structure has an electrical resistivity lower than a resistivity of the first magnetic structure or the second magnetic structure.

14. The magnetic recording head of claim 13, wherein the first heavy metal structure is in contact with the first magnetic structure and the second magnetic structure.

15. The magnetic recording head of claim 9, wherein the first heavy metal structure has an electrical resistivity greater than a resistivity of the first magnetic structure or the second magnetic structure.

16. The magnetic recording head of claim 15, further comprising a first magnetic shunt blocking layer disposed between the first heavy metal structure and the first magnetic structure and a second magnetic shunt blocking layer disposed between first heavy metal structure and the second magnetic structure.

17. The magnetic recording head of claim 16, wherein the first and second magnetic shunt blocking layers each comprise a material selected from the group consisting of Fe—Co-M, Fe—Co-M-$MeO_x$ granular film, (Fe—Co-M-$MeO_x$), multilayer film, Ni—Mn—Mg—Zn—$FeO_x$ soft ferrites, Fe—Co-M-(Ni—Mn—Mg—Zn—$FeO_x$) granular film, and Fe—Co-M-(Ni—Mn—Mg—Zn—$FeO_x$), multilayer film, wherein M is one or more of the following: B, Si, P, Al, Hf, Zr, Nb, Ti, Ta, Mo, Mg, Y, Cu, Cr, and Ni, and Me is Si, Al, Hf, Zr, Nb, Ti, Ta, Mg, Y, or Cr.

18. The magnetic recording head of claim 9, wherein the dielectric material is disposed between the first magnetic structure and the main pole.

19. The magnetic recording head of claim 9, wherein the first heavy metal structure has a substantially uniform thickness ranging from about 4 nm to about 6 nm.

20. The magnetic recording head of claim 19, wherein the first magnetic structure and the second magnetic structure each have a substantially uniform thickness ranging from about 3 nm to about 7 nm.

21. The magnetic recording head of claim 9, further comprising a second heavy metal structure surrounding the second magnetic structure.

22. The magnetic recording head of claim 21, wherein the second heavy metal structure comprises a same material as the first heavy metal structure.

23. The magnetic recording head of claim 21, further comprising a third magnetic structure coupled to the second heavy metal structure.

24. The magnetic recording head of claim 23, wherein the third magnetic structure comprises a same material as the first magnetic structure.

25. A magnetic recording head, comprising:
a trailing shield hot seed layer;
a main pole;
a heavy metal layer disposed between the trailing shield hot seed layer and the main pole;
a first magnetic structure surrounding a portion of the main pole at a media facing surface;
a first heavy metal structure surrounding the first magnetic structure; and
a second magnetic structure surrounding the first heavy metal structure, wherein the first heavy metal structure is sandwiched between the first magnetic structure and the second magnetic structure.

26. The magnetic recording head of claim 25, further comprising a first magnetic shunt blocking layer and second magnetic shunt blocking layer, wherein the first magnetic shunt blocking layer is in contact with the main pole and the heavy metal layer, and the second magnetic shunt blocking layer is in contact with the trailing shield hot seed layer and the heavy metal layer.

27. The magnetic recording head of claim 25, further comprising a second heavy metal structure surrounding the second magnetic structure.

28. The magnetic recording head of claim 27, further comprising a third magnetic structure coupled to the second heavy metal structure.

29. The magnetic recording head of claim 28, wherein the magnetic recording head does not include a side shield.

30. A magnetic recording head, comprising:
a main pole;
a trailing shield;
means for generating spin-orbit torque; and
means for reducing magnetic flux shunting from the main pole to the trailing shield, wherein the means for reducing magnetic flux shunting from the main pole to the trailing shield is in contact with the means for generating spin-orbit torque.

* * * * *